(12) United States Patent
Hayashi

(10) Patent No.: US 11,155,448 B2
(45) Date of Patent: Oct. 26, 2021

(54) CRANE AND INFORMATION DISPLAY METHOD

(71) Applicant: TADANO LTD., Kagawa (JP)

(72) Inventor: Hiroyuki Hayashi, Kagawa (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 16/977,376

(22) PCT Filed: Mar. 8, 2019

(86) PCT No.: PCT/JP2019/009293
§ 371 (c)(1),
(2) Date: Sep. 1, 2020

(87) PCT Pub. No.: WO2019/172414
PCT Pub. Date: Sep. 12, 2019

(65) Prior Publication Data
US 2021/0053803 A1 Feb. 25, 2021

(30) Foreign Application Priority Data
Mar. 9, 2018 (JP) .............................. JP2018-043255

(51) Int. Cl.
*B66C 23/00* (2006.01)
*B66C 23/90* (2006.01)
(Continued)

(52) U.S. Cl.
CPC .............. *B66C 23/90* (2013.01); *B66C 13/16* (2013.01); *B66C 13/46* (2013.01); *B66C 23/36* (2013.01);
(Continued)

(58) Field of Classification Search
CPC ......... B66C 23/90; B66C 13/04; B66C 13/46; B66C 13/48; B66C 15/045; B66C 15/065; G06T 7/62
See application file for complete search history.

(56) References Cited

U.S. PATENT DOCUMENTS 11,066,280 B2 * 7/2021 Almhager ............ H04N 5/2628
2016/0119589 A1 * 4/2016 Tanizumi ................ B66C 13/16
348/144
(Continued)

FOREIGN PATENT DOCUMENTS

JP H07-089697 A 4/1995

OTHER PUBLICATIONS

May 28, 2019, International Search Report issued for related PCT application No. PCT/JP2019/009293.
(Continued)

*Primary Examiner* — Emmanuel M Marcelo
(74) *Attorney, Agent, or Firm* — Paratus Law Group, PLLC

(57) ABSTRACT

There is provided a crane for enabling easily carrying out an operation of a boom such as raising and lowering, telescoping, or turning, by displaying a range wherein a hook may be moved or may not be moved in a direction approaching a vehicle part of the crane. The crane includes: a vehicle; a boom positioned upon the vehicle; a wire rope being suspended from a base end side of the boom toward a leading end side thereof; a hook being hung from the leading end side of the boom and raised and lowered by winding and unwinding the wire rope; a camera for photographing an image including the hook; a display device for displaying the image; and a control device connected to the camera and the display device, the control device being for processing information. On the basis of the length of the boom or the height of the hook, the control device computes an inner
(Continued)

boundary which is a boundary between a range where the hook may move, and a range where the hook may not move, in a direction approaching the vehicle. The display device displays an image wherein images indicating the inner boundary are superimposed on the image photographed with the camera.

6 Claims, 6 Drawing Sheets

(51) Int. Cl.
    *G06T 7/62*      (2017.01)
    *B66C 13/16*      (2006.01)
    *B66C 13/46*      (2006.01)
    *B66C 23/36*      (2006.01)
    *G06T 11/00*      (2006.01)
    *H04N 7/18*      (2006.01)

(52) U.S. Cl.
    CPC ................ *G06T 7/62* (2017.01); *G06T 11/00* (2013.01); *H04N 7/183* (2013.01); *B66C 2700/0371* (2013.01); *G06T 2207/30252* (2013.01)

(56) References Cited

U.S. PATENT DOCUMENTS

2019/0094834 A1\*    3/2019    Bramberger ..... G06Q 10/06315
2019/0284027 A1\*    9/2019    Albrecht ................ B66C 13/46

OTHER PUBLICATIONS

May 28, 2019, International Search Opinion issued for related PCT application No. PCT/JP2019/009293.

\* cited by examiner

CRANE AND INFORMATION DISPLAY METHOD

CROSS REFERENCE TO PRIOR APPLICATION

This application is a National Stage Patent Application of PCT International Patent Application No. PCT/JP2019/009293 (filed on Mar. 8, 2019) under 35 U.S.C. § 371, which claims priority to Japanese Patent Application No. 2018-043255 (filed on Mar. 9, 2018), which are all hereby incorporated by reference in their entirety.

TECHNICAL FIELD

The present invention relates to a crane and an information display method.

BACKGROUND ART

Conventionally, a crane composed of a vehicle and a crane apparatus is known. The vehicle is equipped with a plurality of wheels and outriggers, and can move to an unspecified place, thereby expanding a workable range at the destination. In addition to a boom, the crane apparatus is composed of wire ropes, hooks, and so on, so that a load can be moved.

A technique for displaying a movable range of a distal end of a boom on a display apparatus in such a crane has been known (see Patent Literature (hereinafter referred to as "PLT") 1). According to this, since the operator can grasp the movable range of the distal end of the boom by looking at the display apparatus, he/she can easily perform manipulations such as luffing-up/down, extension/retraction, and swivel of the boom.

CITATION LIST

Patent Literature

PTL 1
Japanese Patent Application Laid-Open No. 1995-89697

SUMMARY OF INVENTION

Technical Problem

However, although the movable range described in PTL 1 shows the boundary in a direction in which the distal end of the boom is away from the vehicle, the movable range does not show the boundary in a direction in which the distal end of the boom approaches the vehicle. In other words, the direction in which the distal end of the boom approaches the vehicle all falls within the movable range. Accordingly, the operator can refer to the displayed movable range when moving the load suspended on the hook in a direction away from the vehicle, but cannot refer to the displayed movable range when moving the load suspended on the hook in a direction approaching the vehicle.

It is an object of the present invention to provide a crane capable of easily performing manipulations such as luffing-up/down, extension/retraction and swivel of the boom by displaying a non-movable or movable range in a direction in which a hook approaches a vehicle. It is another object of the present invention to provide an information display method capable of easily performing manipulations such as luffing-up/down, extension/retraction and swivel of a boom by displaying a non-movable or movable range in a direction in which a hook approaches a vehicle.

Solution to Problem

The crane of the present invention comprise: a vehicle; a boom disposed on the vehicle; a wire rope spanning from a base end side to a distal end side of the boom; a hook hanging from the distal end side of the boom and ascending and descending by feeding in and feeding out the wire rope; a camera that takes an image including the hook a display apparatus for displaying the image; and a control apparatus connected to the camera and the display apparatus and configured to process information, wherein the control apparatus preferably calculates an inner boundary based on a length of the boom or a height of the hook, the inner boundary being a boundary between a movable range and a non-movable range in a direction in which the hook approaches the vehicle, and the display apparatus preferably displays an image in which an image indicating the inner boundary is superimposed on the image taken by the camera.

In the crane of the present invention, the movable range may be a range in which the boom is movable after being luffed up with the length of the boom maintained.

In the crane of the present invention, the movable range may be a range in which the boom is movable after being luffed up and/or swiveled with the height of the hook maintained.

In the crane of the present invention, when the vehicle is positioned outside the image taken by the camera, the display apparatus may display an image in which an image indicating a direction in which the vehicle is positioned is superimposed on the image taken by the camera.

In the crane of the present invention, the control apparatus may calculate a swivel boundary which is a boundary between a swivelable range and a non-swivelable range of the boom, and the display apparatus may display an image in which an image indicating the swivel boundary is superimposed on the image taken by the camera.

The information display method of the present invention is an information display method in a crane, the crane comprising: a vehicle; a boom disposed on the vehicle; a wire rope spanning from a base end side to a distal end side of the boom; a hook hanging from the distal end side of the boom and ascending and descending by feeding in and feeding out the wire rope; a camera that takes an image including the hook; a display apparatus that displays the image; and a control apparatus connected to the camera and configured to process information, the method comprising: calculating by the control apparatus an inner boundary based on a length of the boom or a height of the hook, the inner boundary being a boundary between a movable range and a non-movable range in a direction in which the hook approaches the vehicle; and displaying by the display apparatus, an image in which an image indicating the inner boundary is superimposed on the image taken by the camera.

Advantageous Effects of Invention

According to the crane and the information display method of the present invention, by displaying an image in which an image indicating the inner boundary is superimposed on an image taken by the camera on the display apparatus, the operator can visually grasp the movable range in a direction in which the hook approaches the vehicle by viewing the display apparatus, so that it is possible to easily perform manipulations such as luffing-up/down, extension/retraction, and swivel of the boom.

DESCRIPTION OF EMBODIMENT

Figure 1:
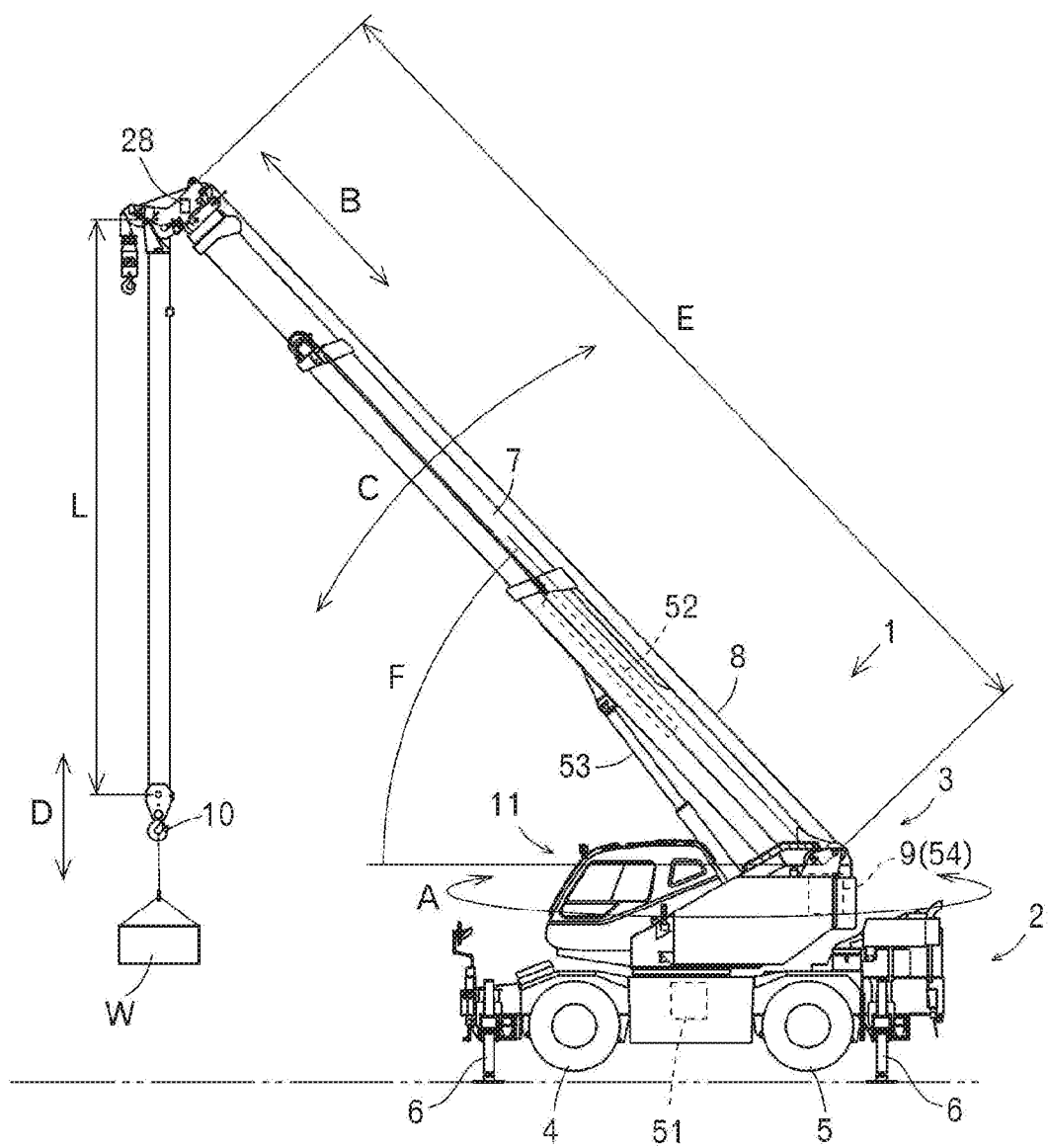
FIG. 1 illustrates a crane of an embodiment.

Crane 1 will be described with reference to FIG. 1.
Crane 1 is mainly composed of vehicle 2 and crane apparatus 3.
Vehicle 2 includes a left-right pair of wheels 4 and a left-right pair of rear wheels 5. In addition, vehicle 2 is provided with outrigger 6 which is grounded for stabilization when carrying out the transporting work of load W. Further, vehicle 2 is provided with an engine, a transmission, or the like for driving them.

Crane apparatus 3 is provided with boom 7 such that boom 7 protrudes forward from the rear portion. Therefore, boom 7 is swivelable by an actuator (see arrow A). Further, boom 7 is extendable and retractable by an actuator (see arrow B). Furthermore, boom 7 is capable of being luffed up and down by an actuator (see arrow C). In addition, wire rope 8 is stretched over boom 7. On the base end side of boom 7, winch 9 wrapped around wire rope 8 is disposed, on the distal end side of boom 7, hook 10 is suspended by wire rope 8. Winch 9 is integrally configured with the actuator to allow winding and unwinding of wire rope 8. Therefore, hook 10 is movable up and down by an actuator (see arrow D). Further, crane apparatus 3 includes cabin 11 on the side of boom 7. Inside cabin 11, as described later, swivel manipulation tool 21, telescopic manipulation tool 22, luffing manipulation tool 23, winding manipulation tool 24, manipulation tool 25, display apparatus 26 is provided.

Figure 2:
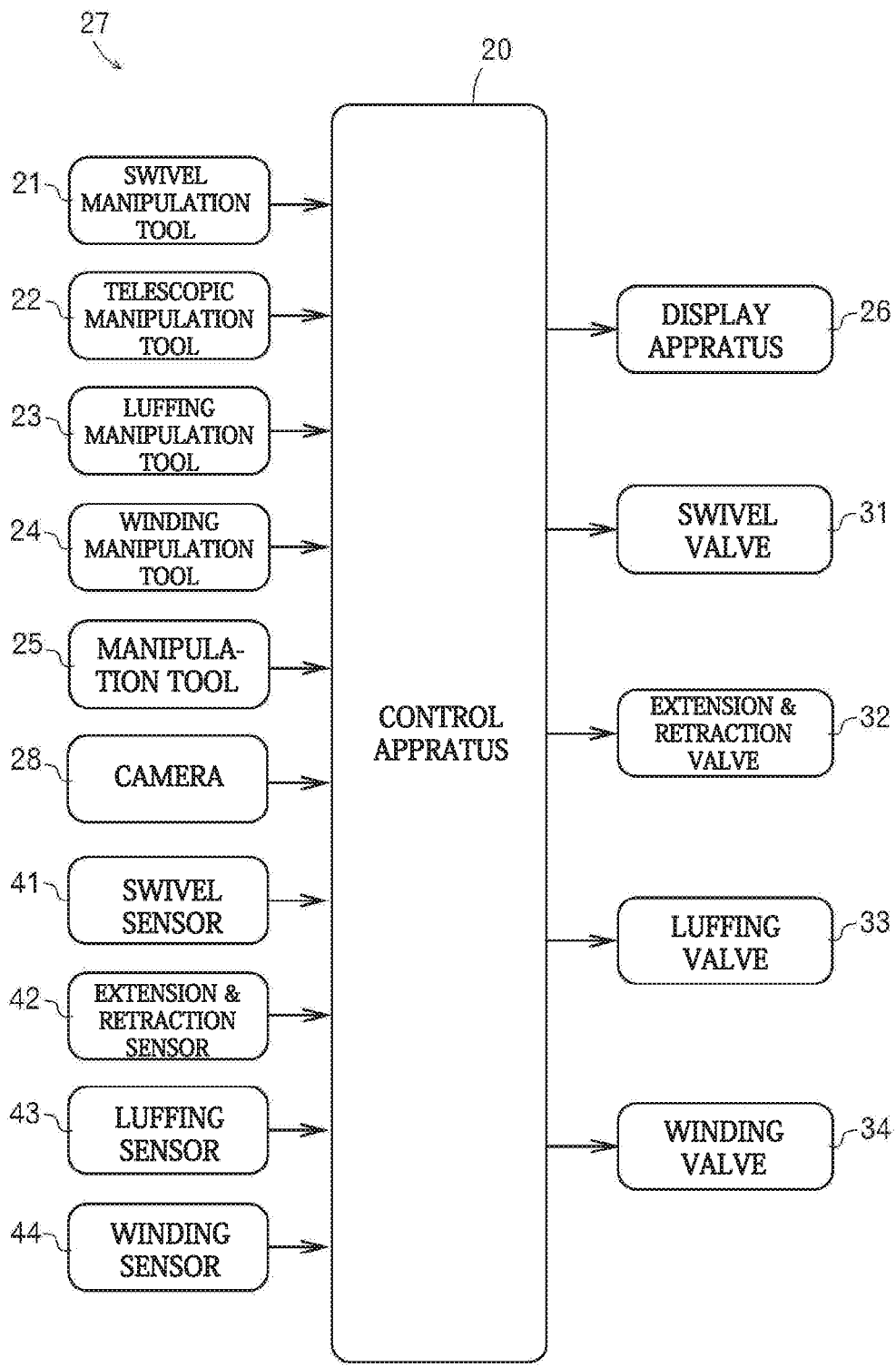
FIG. 2 is a diagram illustrating a configuration of an information display system.
Figure 3:
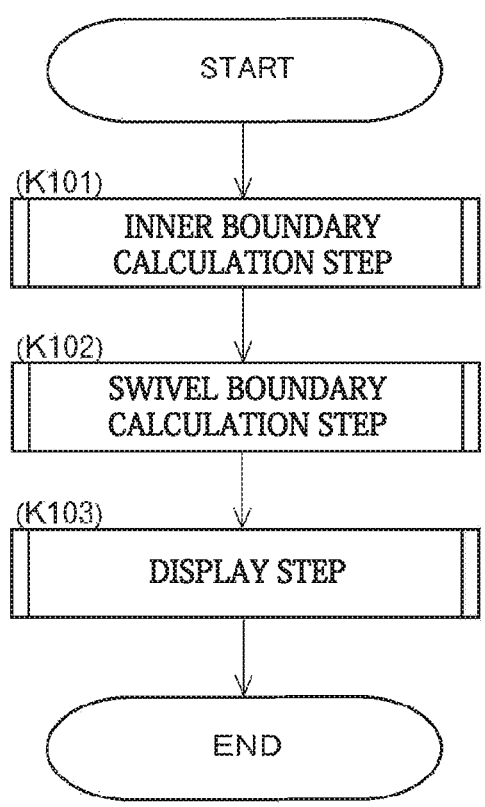
FIG. 3 is a diagram illustrating a flowchart of an information display method.

Next, information display system 27 will be described with reference to FIG. 2.

Information display system 27 is mainly composed of control apparatus 20. Various manipulation tools 21 to 24 are connected to control apparatus 20. Further, various valves 31 to 34 are connected to control apparatus 20. In addition, various sensors 41 to 44 are connected to control apparatus 20.

As described above, boom 7 is swivelable by an actuator (see arrow A in FIG. 1). In the present embodiment, such an actuator is defined as swivel hydraulic motor 51 (see FIG. 1). Swivel hydraulic motor 51 is appropriately operated by swivel valve 31, which is an electromagnetic proportional switching valve. In other words, swivel hydraulic motor 51 is appropriately operated by swivel valve 31 switching the flow direction of the hydraulic oil or adjusting the flow rate of the hydraulic oil. Further, the swivel angle of boom 7 (not shown) is detected by swivel sensor 41. Therefore, control apparatus 20 can recognize the swivel angle of boom 7.

As described above, boom 7 is capable of being extended and retracted by the actuator (see arrow B in FIG. 1). In the present embodiment, such an actuator is defined as hydraulic cylinder 52 for extension and retraction (see FIG. 1). Extension and retraction hydraulic cylinder 52 is appropriately operated by extension and retraction valve 32, which is an electromagnetic proportional switching valve. In other words, extension and retraction hydraulic cylinder 52 is appropriately operated by extension and retraction valve 32 switching the flow direction of the hydraulic oil or adjusting the flow rate of the hydraulic oil. Extension/retraction length E of boom 7 (see FIG. 1) is detected by extension and retraction sensor 42. Therefore, control apparatus 20 can recognize extension/retraction length E of boom 7.

Further, as described above, boom 7 is capable of being luffed up/down by an actuator (see arrow C in FIG. 1). In the present embodiment, such an actuator is defined as luffing hydraulic cylinder 53 (see FIG. 1). Luffing hydraulic cylinder 53 is appropriately operated by luffing valve 33, which is an electromagnetic proportional switching valve. In other words, luffing hydraulic cylinder 53 is appropriately operated by luffing valve 33 switching the flow direction of the hydraulic oil or adjusting the flow rate of the hydraulic oil. Further, luffing angle F of boom 7 (see FIG. 1) is detected by luffing sensor 43. Therefore, control apparatus 20 can recognize luffing angle F of boom 7.

In addition, as described above, hook 10 is movable up and down by an actuator (see arrow D in FIG. 1). In the present embodiment, such an actuator is defined as winding hydraulic motor 54 (see FIG. 1). Winding hydraulic motor 54 is appropriately operated by winding valve 34, which is an electromagnetic proportional switching valve. That is, winding hydraulic motor 54, is appropriately operated by winding valve 34 switching the flow direction of the hydraulic oil or adjusting the flow rate of hydraulic oil. Hanging length L of hook 10 (see FIG. 1) is detected by winding sensor 44. Therefore, control apparatus 20 can recognize hanging length L of hook 10.

In addition, manipulation tool 25, camera 28, and display apparatus 26 are connected to control apparatus 20.

Manipulation tool 25 selectively switches the display mode of display apparatus 26, or switches the photographing magnification and the photographing direction of camera 28. The display mode includes a display of an image taken by camera 28, a display of an image indicating the boundary between the movable range and the non-movable range of hook 10 superimposed on the image, a display of an image indicating the boundary between the swivelable range and the non-swivelable range of boom 7 superimposed on the image or the like.

Camera 28 is for taking an image. Camera 28 is attached to a distal end portion of boom 7. Control apparatus 20 may be controlled so that camera 28 takes an image that includes hook 10. Camera 28 is capable of taking images in nearly real time.

As described above, display apparatus 26 displays an image taken by camera 28, an image of superimposing an image representing the boundary between the movable range and the non-movable range of hook 10 on the image, an image of superimposing an image representing the boundary between the swivelable range and the non-swivelable range of boom 7 on the image, and the like.

Next, a display mode of display apparatus 26 will be described with reference to FIGS. 3 to 6. Here, as shown in FIG. 1, a state in which hook 10 is in a state in which load W is suspended, and a state in which the height from the ground to the bottom surface of load W is lower than the height of vehicle 2 will be described.

The inner boundary, which is the boundary between the movable range and the non-movable range of load W in the direction in which hook 10 approaches vehicle 2, and the swivel boundary, which is the boundary between the swivelable range and the non-swivelable range of boom 7 are displayed after inner boundary calculation step K101, swivel boundary calculation step K102, and display step K103.

In inner boundary calculation step K101, control apparatus 20 computes the first inner boundary that is the boundary between the movable range and the non-movable range of load W in the direction in which hook 10 approaches vehicle 2 based on the length of boom 7. Specifically, control apparatus 20 recognizes the current length of boom 7 and calculates the inner boundary (first inner boundary) of the range in which hook 10 is movable when boom 7 is luffed up with its length maintained. Since the maximum value of luffing angle F is determined by the specification of crane 1, the first inner boundary is determined by determining the length of boom 7.

Further, in inner boundary calculation step KIO, control apparatus 20 computes the second inner boundary that is the boundary between the movable range and the non-movable range of load W in the direction in which hook 10 approaches vehicle 2 based on the height of hook 10. Specifically, control apparatus 20 recognizes the height from the ground to the bottom surface of load W, and calculates an inner boundary (second inner boundary) within a range in which when boom 7 is luffed up and/or swiveled with the height of hook 10 maintained can be moved without load W's collision with vehicle 2.

Since the height of vehicle 2 is determined by the specification of crane 1, by determining the height from the ground to the bottom surface of load W, it can be determined whether or not load W collides with vehicle 2 when hook 10 is moved in a direction approaching vehicle 2 with the current height of hook 10 maintained. As a result, the second inner boundary along the outer periphery of vehicle 2 is determined in the case of collision. On the other hand, the second inner boundary is not calculated in the case of no collision.

The height from the ground to the bottom surface of load W can be calculated, for example, by obtaining the length from hook 10 to the bottom surface of load W in advance. Specifically, from the detection result of winding sensor 44 at the time of lifting off load W, the time when wire rope 8 is in a tension state is recognized. Then, the value obtained by subtracting hanging length L of hook 10 from the height of the distal end of boom 7 at that time becomes the length from hook 10 to the bottom surface of load W. Therefore, subsequently in order to determine the height from the ground to the bottom surface of load W in a state in which load W is lifted, a value obtained by adding the length from hook 10 obtained in advance to hanging length L of hook 10 to the bottom surface of load W may be subtracted from the height of the distal end of boom 7.

In swivel boundary calculation step K102, control apparatus 20 calculates a swivel boundary which is a boundary between the swivel range and the non-swivel range of boom 7. The swivelable range of boom 7 is a range in which crane 1 can be swiveled without falling down, and the swivel boundary is calculated based on the length of boom 7, luffing angle F of boom 7, and the load detected by winding sensor 44.

Figure 4:
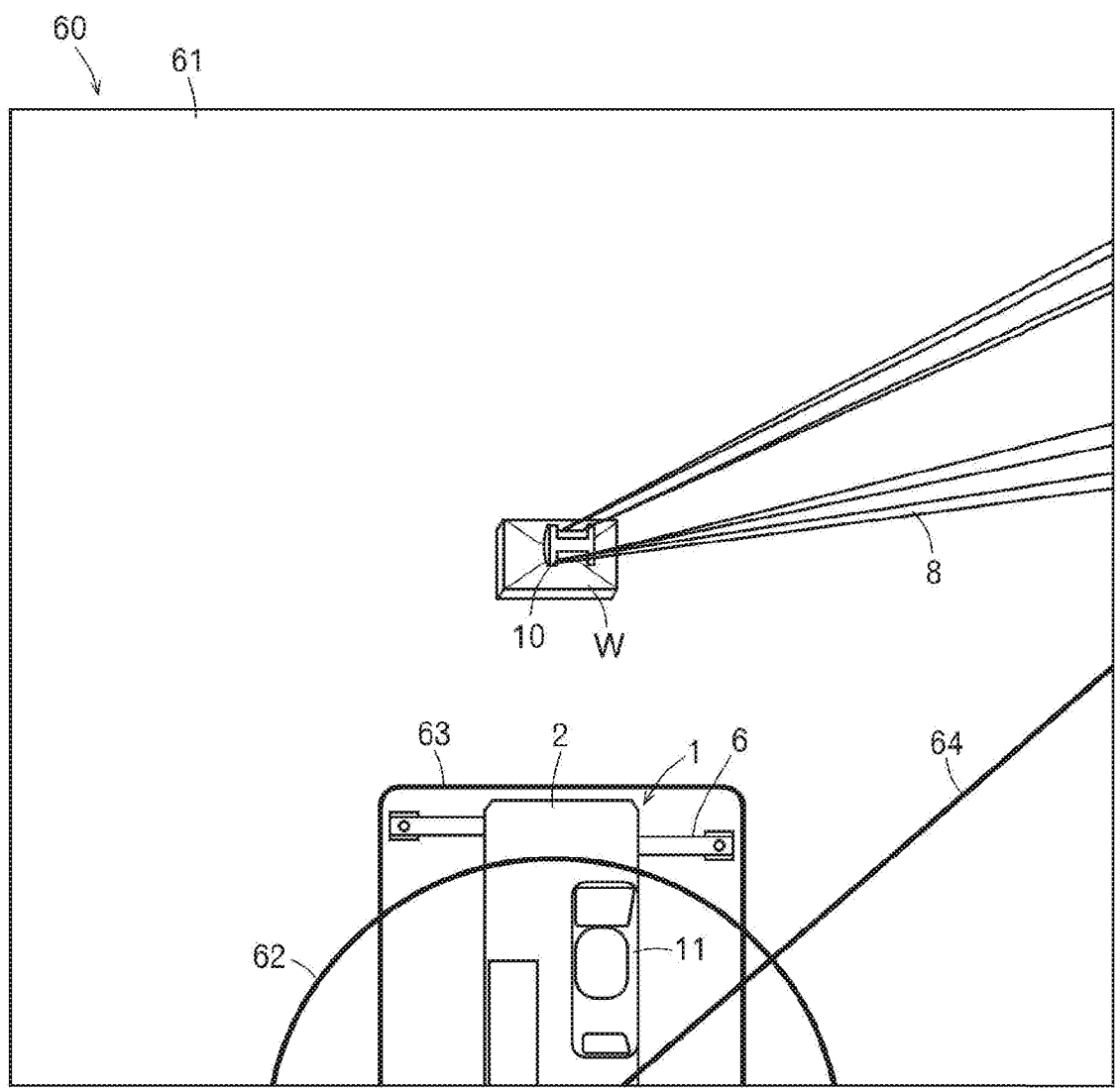
FIG. 4 is a diagram illustrating one example of an output image.

In display step K103, display apparatus 26 displays the image, which an image showing the inner boundaries (the first inner boundary and the second inner boundary) and an image showing the swivelable boundary superimposed to the image taken by camera 28 (see FIG. 4). Specifically, control apparatus 20 superimposes image 62 indicating the first inner boundary, image 63 indicating the second inner boundary, and image 64 indicating the swivel boundary on image 61 taken by camera 28 to generate output image 60. Then, control apparatus 20 outputs output image 60 to display apparatus 26, display apparatus 26 displays output image 60.

In FIG. 4, image 62 showing the first inner boundary, image 63 showing the second inner boundary, and an image 64 showing the swivel boundary display the boundary lines. Therefore, the range from the position of load W displayed on output image 60 to each boundary line is a range in which load W can move. Instead of the boundary lines, a movable range or a non-movable range may be displayed in a color different from the surrounding. For example, the movable range may be displayed in color, and the non-movable range may be displayed in black and white.

In addition to the calculation result of swivel boundary calculation step K102, the swivel boundary may be arbitrarily inputted by the operator. It may be contemplated that the operator enters for example, the swivel range of a building wall or a nearby crane as a swivel boundary. In this case, the swivel boundary input by the operator is similarly superimposed on output image 60.

Thus, by displaying output image 60 in which images 62, 63 indicating the inner boundary and image 64 indicating the swivel boundary are superimposed on image 61 taken by camera 28 to display apparatus 26, the operator by viewing display apparatus 26 can visually grasp the movable range of the direction and the swivel direction in which load W approaches vehicle 2, can perform manipulations such as luffing-up/down, extension/retraction, and swivel of the boom.

Figure 5:
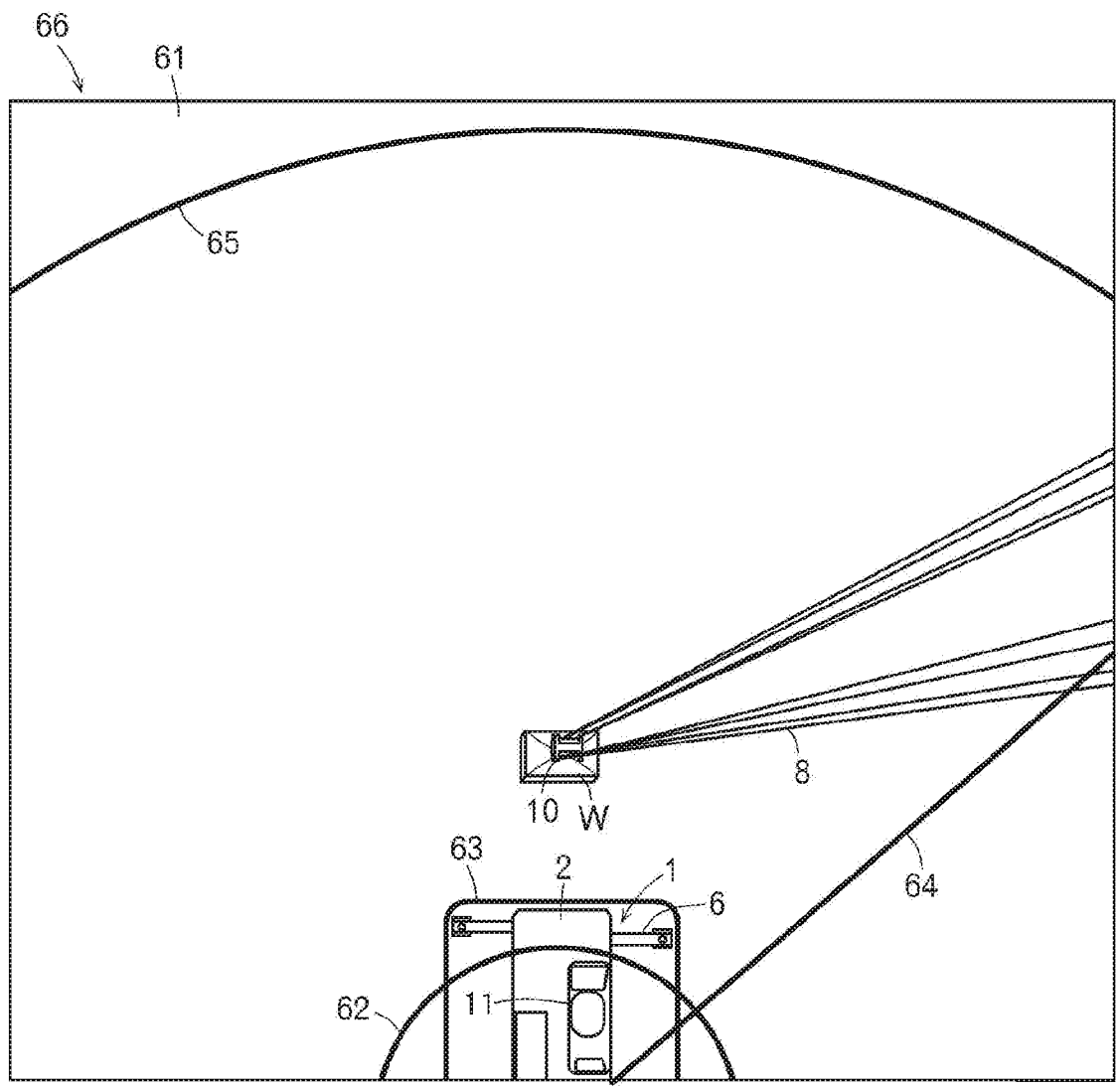
FIG. 5 is a diagram illustrating one example of an output image.

Furthermore, between inner boundary calculation step K101 and swivel boundary calculation step K102, an outer boundary calculation step may be added, and in display step K103, display apparatus 26 may display an image in which an image indicating the outer boundary superimposed on the image taken by camera 28 (see FIG. 5). Specifically, control apparatus 20 recognizes the current length of boom 7 and the load detected by winding sensor 44, and calculates the outer boundary of the range in which hook 10 is movable when boom 7 is luffed down with its length maintained. The range in which hook 10 can be moved is a range in which crane 1 can be luffed down without collapsing, and the outer boundary is calculated based on the current length of boom 7 and the load detected by winding sensor 44.

Subsequently, control apparatus 20 superimposes image 62 indicating the first inner boundary, image 63 indicating the second inner boundary, image 64 indicating the swivel boundary, and image 65 indicating the outer boundary on image 61 taken by camera 28 to generate output image 66. Then, control apparatus 20 outputs output image 66 to display apparatus 26, and display apparatus 26 displays output image 66.

Thus, by displaying output image 66 in which image 65 indicating the outer boundary superimposed on image 61 taken by camera 28 on display apparatus 26, since the operator can visually grasp the movable range in the direction in which load W is away from vehicle 2 by viewing display apparatus 26, he/she can easily perform manipulations such as luffing up/down, extension/retraction, and swivel of the boom.

Figure 6:
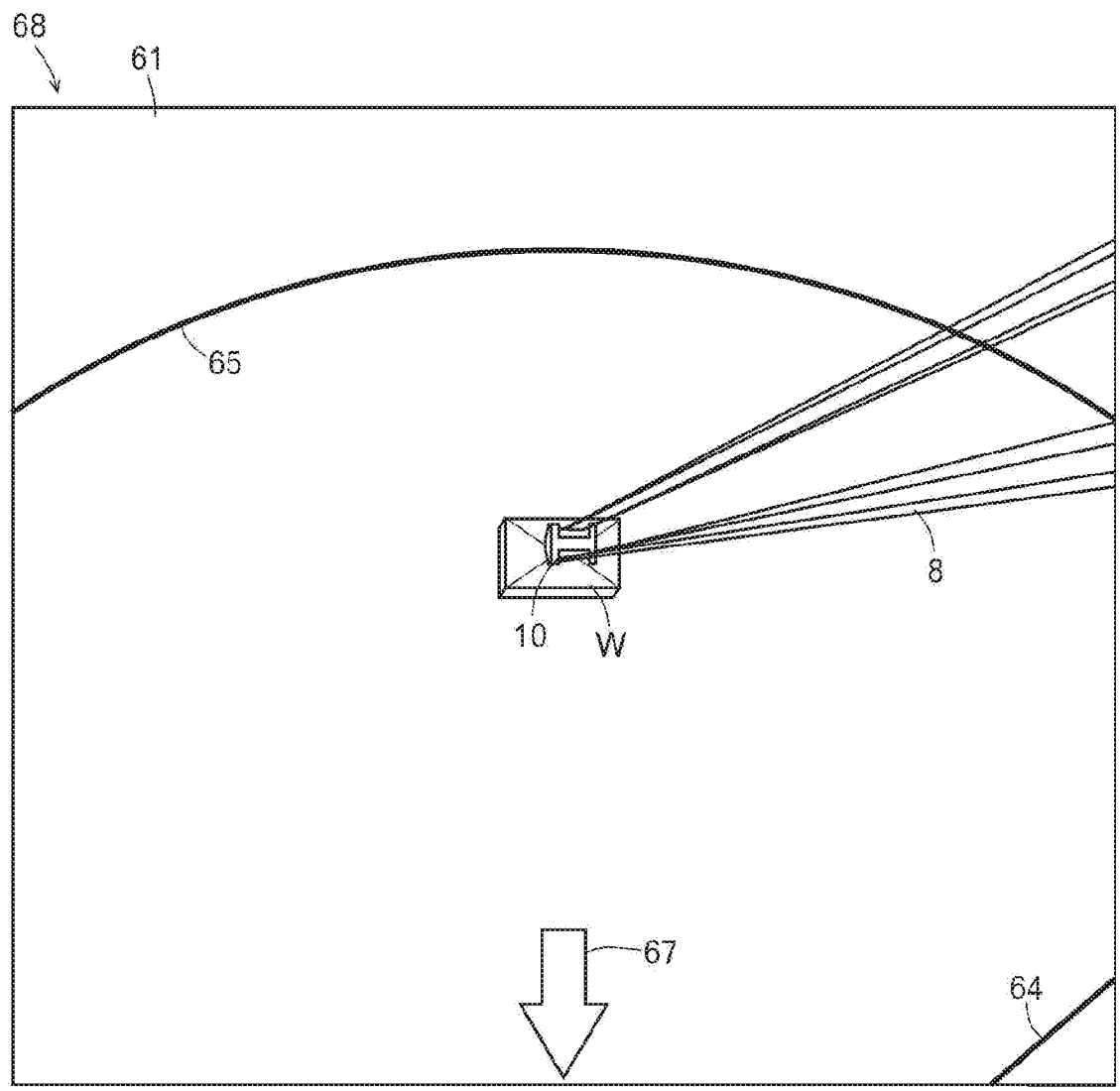
FIG. 6 is a diagram illustrating one example of an output image.

Furthermore, when vehicle 2 is positioned outside the image taken by camera 28, display apparatus 26 may display the image, in which the image indicating the direction in which vehicle 2 is positioned superimposed on the image taken by camera 28 (see FIG. 6). Specifically, control apparatus 20 recognizes the position of vehicle 2 outside the image taken by camera 28, and superimposes an arrow image 67 indicating the direction in which vehicle 2 is positioned and images 64 and 65 indicating each boundary to image 61 taken by camera 28 to generate output image 68. Then, control apparatus 20 outputs output image 68 to display apparatus 26, and display apparatus 26 displays output image 68.

Thus, when the vehicle is positioned outside the image taken by the camera, by displaying output image 68, in which arrow image 67 indicating the direction in which vehicle 2 is superimposed on image 61 taken by camera 28 on display apparatus 26, the operator by viewing display apparatus 26 can visually grasp the direction in which vehicle 2 is positioned, therefore he/she can easily perform manipulations such as luffing-up/down, extension/retraction, and swivel of the boom.

In the above-described embodiment, the case has been described in which load W is suspended by hook 10 as an example, but even when the load is not suspended by hook 10, the boundary between the movable range and the non-movable range of hook 10 can be calculated and displayed similarly. In this case, the second inner boundary is the boundary of the range in which hook 10 does not interfere with vehicle 2.

Further, image 62 showing the first inner boundary, image 63 showing the second inner boundary, image 64 showing the swivel boundary, image 65 showing the outer boundary may be superimposed alone on the image taken by camera 28, or a combination of them may be displayed as appropriate. These display modes may be switched by manipulating tool 25.

Further, crane 1 may be provided with a jib for enlarging the lifting range and the working radius of crane apparatus 3. In this case, similarly for the hook of the jib, it is possible to display an image showing the inner boundary, the swivel boundary, the outer boundary.

Output images 60, 66, and 68 shown in FIGS. 4 to 6 may be displayed three-dimensionally using 3D mappings or the like.

INDUSTRIAL APPLICABILITY

The present invention is applicable to a crane and an information display method.

REFERENCE SIGNS LIST

1 Crane
2 Vehicle
7 Boom
8 Wire rope
10 Hook
20 Control apparatus
26 Display apparatus
28 Camera
62, 63 Images (images showing inner boundary)
64 Image (image showing swivel boundary)

The invention claimed is:

1. A crane comprising:
a vehicle;
a boom disposed on the vehicle;
a wire rope spanning from a base end side to a distal end side of the boom;
a hook hanging from the distal end side of the boom and ascending and descending by feeding in and feeding out the wire rope;
a camera that takes an image including the hook;
a control apparatus connected to the camera and the display apparatus and configured to process information, the control apparatus calculates an inner boundary based on a length of the boom or a height of the hook, the inner boundary being a boundary between a movable range and a non-movable range in a direction in which the hook approaches the vehicle; and
a display apparatus that displays an image in which an image indicating the inner boundary is superimposed on the image taken by the camera.

2. The crane according to claim 1, wherein
the movable range is a range in which the boom is movable after being luffed up with the length of the boom maintained.

3. The crane according to claim 1, wherein
the movable range is a range in which the boom is movable after being luffed up and/or swiveled with the height of the hook maintained.

4. The crane according to claim 1, wherein
when the vehicle is positioned outside the image taken by the camera, the display apparatus displays an image in which an image indicating a direction in which the vehicle is positioned is superimposed on the image taken by the camera.

5. The crane according to claim 1, wherein
the control apparatus calculates a swivel boundary which is a boundary between a swivelable range and a non-swivelable range of the boom,
the display apparatus displays an image in which an image indicating the swivel boundary is superimposed on the image taken by the camera.

6. An information display method performed in a crane, the crane comprising:
a vehicle;
a boom disposed on the vehicle;
a wire rope spanning from a base end side to a distal end side of the boom;
a hook hanging from the distal end side of the boom and ascending and descending by feeding in and feeding out the wire rope;
a camera that takes an image including the hook;
a display apparatus that displays the image; and
a control apparatus connected to the camera and configured to process information,
the method comprising:
calculating by the control apparatus an inner boundary based on a length of the boom or a height of the hook, the inner boundary being a boundary between a movable range and a non-movable range in a direction in which the hook approaches the vehicle; and
displaying by the display apparatus, an image in which an image indicating the inner boundary is superimposed on the image taken by the camera.

* * * * *